(12) United States Patent
Park et al.

(10) Patent No.: US 11,190,490 B2
(45) Date of Patent: Nov. 30, 2021

(54) EMBEDDED VIRTUAL PRIVATE NETWORK

(71) Applicant: Allstate Insurance Company, Northbrook, IL (US)

(72) Inventors: Jason Park, Chicago, IL (US); John Parkinson, Wheaton, IL (US); Mark D. Hansen, Greensboro, NC (US); Nicolette De Guia, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 356 days.

(21) Appl. No.: 16/149,686

(22) Filed: Oct. 2, 2018

(65) Prior Publication Data

US 2020/0106746 A1    Apr. 2, 2020

(51) Int. Cl.
*H04L 29/06* (2006.01)
(52) U.S. Cl.
CPC ........ *H04L 63/0272* (2013.01); *H04L 63/029* (2013.01); *H04L 63/0478* (2013.01); *H04L 63/1416* (2013.01)
(58) Field of Classification Search
None
See application file for complete search history.

(56) References Cited

U.S. PATENT DOCUMENTS 6,496,702 B1   12/2002   Lockhart
7,430,759 B2    9/2008   Piepiorra et al.
(Continued)

FOREIGN PATENT DOCUMENTS

CN    102065125 A     5/2011
EP       1643691 B1   12/2007
(Continued)

OTHER PUBLICATIONS

Deshmukh, Dnyanesh; Iyer, Brijesh. Design of IPSec virtual private network for remote access. 2017 International Conference on Computing, Communication and Automation (ICCCA). https://ieeexplore.ieee.org/stamp/stamp.jsp?tp=&arnumber=8229894 (Year: 2017).*

(Continued)

*Primary Examiner* — Jeremiah L Avery
(74) *Attorney, Agent, or Firm* — Brooks Kushman P.C.

(57) ABSTRACT

Connecting to an unsecured wired or wireless network poses severe security and privacy risks. An individual application such as a mobile online banking application address this by using point to point private network connections. Browsers, however, generally do not use point to point private network connections and depend on the target website to establish a secure connection. Providing a secure connection that is the default for all network access and that encrypts all over the air or over the wire traffic mitigates these risks. However, virtual client networks (VPNs) client applications can be difficult to set up and need to be always on to ensure that all network activity is secure. By embedding a VPN capability and automating the connection process, a safe and secure network connection can be made available to users of computing devices. An embedded private connect VPN system may use Domain Name Server (DNS) functionality to determine which data or content streams are to be transmitted through a generated private connect VPN tunnel.

20 Claims, 14 Drawing Sheets

(56) References Cited

U.S. PATENT DOCUMENTS

| | | | |
|---|---|---|---|
| 7,882,557 B2 | 2/2011 | Coskun et al. | |
| 7,920,549 B2* | 4/2011 | Alt | H04W 12/086 |
| | | | 370/352 |
| 7,933,990 B2* | 4/2011 | Munger | H04L 61/2092 |
| | | | 709/225 |
| 8,458,787 B2 | 6/2013 | Wei et al. | |
| 8,509,169 B2 | 8/2013 | Van Der Merwe et al. | |
| 8,521,888 B2* | 8/2013 | Larson | H04L 63/0485 |
| | | | 709/227 |
| 8,918,841 B2 | 12/2014 | Chawla et al. | |
| 8,990,920 B2 | 3/2015 | Pontillo et al. | |
| 9,247,463 B1 | 1/2016 | Guo et al. | |
| 9,288,188 B2 | 3/2016 | Brandstatter | |
| 9,386,035 B2 | 7/2016 | Baliga et al. | |
| 2002/0103931 A1* | 8/2002 | Mott | H04L 12/4641 |
| | | | 709/245 |
| 2003/0093691 A1* | 5/2003 | Simon | H04L 63/20 |
| | | | 726/4 |
| 2004/0168051 A1 | 8/2004 | Guo et al. | |
| 2006/0005240 A1* | 1/2006 | Sundarrajan | H04L 63/166 |
| | | | 726/15 |
| 2006/0080441 A1* | 4/2006 | Chen | H04L 63/0272 |
| | | | 709/225 |
| 2009/0260074 A1 | 10/2009 | De Spiegeleer | |
| 2010/0235481 A1* | 9/2010 | Deutsch | H04L 29/12367 |
| | | | 709/222 |
| 2016/0142374 A1 | 5/2016 | Clark | |
| 2018/0013583 A1 | 1/2018 | Rubenstein et al. | |
| 2018/0041470 A1 | 2/2018 | Schultz et al. | |
| 2019/0173849 A1* | 6/2019 | Lapidous | H04L 63/029 |
| 2019/0229900 A1* | 7/2019 | Khristi | H04L 67/02 |

FOREIGN PATENT DOCUMENTS

| | | |
|---|---|---|
| EP | 2646903 A1 | 10/2013 |
| EP | 2451124 B1 | 12/2013 |
| GB | 201709277 | 7/2017 |
| WO | 03084177 A1 | 10/2003 |

OTHER PUBLICATIONS

Liyanage, Madhusanka et al. Secure hierarchical Virtual Private LAN Services for provider provisioned networks. 2013 IEEE Conference on Communications and Network Security (CNS). https://ieeexplore.IEEE.org/stamp/stamp.jsp?tp=&arnumber=6682712 (Year: 2013).*

Liu, Alex X.; Chen, Fei. Privacy Preserving Collaborative Enforcement of Firewall Policies in Virtual Private Networks. IEEE Transactions on Parallel and Distributions, vol. 22, Issue: 5. https://ieeexplore.ieee.org/stamp/stamp.jsp?tp=&arnumber=5557862 (Year: 2011).*

Dec. 16, 2019—(WO) International Search Report & Written Opinion—PCT/US19/054209.

Surfeasy, Opera Privacy Solutions, http://coxit.net/opera/img/presentations/Chris-Houston_SurfEasy_CMD_2017.pdf.

Privacy and Performance—Opera Software ASA, Annual Report, HYPERLINK "http://coxit.net/opera/annualreport/mg/pdf/Opera-Software-ASA_Annual-Report_2016_privacy.pdr" http://coxit.net/opera/annualreport/img/pdf/Opera-Software-ASA_Annual-Report_2016_privacy.pdf.

Pricing Page, SurfEasy Ultra Fast, No-log VPN for Android, IOS, Mac & Windows, HYPERLINK "https://www.surfeasy.com/pricing/" https://www.surfeasy.com/pricing/.

Features Wangle VPN, Hyperlink "https://wan.gl/features/" https://wan.gl/features/, May 28, 2018.

Wangle VPN App to Become Fastest and Most Secure on Australian Market, HYPERLINK "https://wangletechnologies.com/assets/2017.03.30-WGL-Wangle-VPN-App-to-Become-Fastest-Most-Secure-on-AU-. . . pdf" https://wangletechnologies.com/assets/2017.03.30-WGL-Wangle-VPN-App-to-Become-Fastest-Most-Secure-on-AU-. . . pdf.

ProtonVPN—Free VPN made by ProtonMail—Apps on Google Play, HYPERLINK "https://play.google.com/store/apps/details?id=com.protonvpn.android" https://play.google.com/store/apps/details?id=com.protonvpn.android , 528-18.

ExpressVPN—A Fast and S3ecure VPN, HYPERLINK "https://www.expressvpn.com/androidauthority" https://www.expressvpn.com/androidauthority, May 28, 2018.

Opera VPN 1.5.0 for Android, HYPERLINK "https://opera-vpn.en.uptodown.com/android" https://opera-vpn.en.uptodown.com/android , May 28, 2018.

* cited by examiner

EMBEDDED VIRTUAL PRIVATE NETWORK

FIELD OF ART

The disclosure relates to providing users with an embedded virtual private network (VPN) for safe online connections when communicating over the Internet.

BACKGROUND

Protecting confidential information in today's online environment is difficult due to the increased connectivity and the increased amount of user information accessible via web enabled computing devices. Most network connections are made over the air (OTA) via cellular or Wi-Fi connections. OTA networks are inherently insecure because it is difficult to prevent interception and copying of the signal, so applications that run on mobile devices must handle the security of the network connection and any data transmitted over it.

Browsers, however, generally do not do this, creating a security vulnerability, even if the site being targeted is adequately secured. Additionally, Internet Service Providers (ISPs) and Wi-Fi connectivity or access point providers can inspect and store traffic to monitor browsing and connection habits, opening up privacy concerns. Finally, malicious attackers, equipped with relatively simple hardware and software combinations, can stage "Man in the middle" (MITM) or "drive by" attacks that capture OTA data packets and redirect them to malicious sites.

VPNs create secure, private connections that ensure that traffic cannot be intercepted and that the user can operate anonymously. A VPN application works by establishing a secure connection (generally using IPSec or similar protocol tunnels) to a network point of presence (POP) and then connecting from that POP to the target web site over a secure connection. To the target, traffic appears to be coming from the POP, not the actual user, who is not visible to any intermediary ISP or configuration service provider (CSP).

However, VPN client applications can be difficult to set up and the applications need to be activated to ensure that transmitted network activity is secure. Most users find these applications complicated to set up and difficult to use.

Further, as consumers continue to gain an ever-increasing presence in online environments, there will be an ever-present need to better protect consumers from personal or information being breached (e.g., made available publicly) in order to protect consumers from fraud and/or other harms. Consumers need a system and method which provides a secure connection to their intended online destination over the Internet without the fear that their confidential information may be intercepted and copied by unauthorized entities.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

By embedding a VPN capability inside an application layer and automating the connection process, a safe and secure network connection may be made available to users of computing devices. The embedded private connect VPN system may use Domain Name Server (DNS) functionality to determine which data or content streams are to be transmitted through a generated private connect VPN tunnel.

Aspects of the disclosure address one or more of the issues mentioned above by disclosing methods, computer readable storage media, software, systems, and apparatuses for use by a consumer in order to keep track of a consumer's accounts and to prevent unauthorized access or use of the consumers identified subscriptions and financial accounts. The discovered subscriptions and financial accounts may be listed and displayed to the consumer along with recommendations and assistance for closing any discovered unused or unwanted financial accounts and subscriptions. The described cyber-security system may prevent unauthorized access, use, and security breaches by unauthorized users and devices of the consumer's accounts.

In an aspect of the disclosure, a cyber-security system may be configured to, in operation, analyze the privacy policy or privacy statement for each financial institution or other businesses associated with the consumer determined from an email scan, browser history, and/or browser cache search. The cyber-security system may also analyze the on-line privacy policies or statements of financial institutions and other businesses for which the consumer has an account based on information provided by analysis of the consumer's profile. The determined information may be displayed to the consumer along with recommendations regarding digital safety.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for protecting consumers against data breaches and unauthorized sharing of a consumer's information. A consumer may be presented with a wide range of consumer risks, including cyber-extortion (e.g., ransomware), false/fraudulent account creation, credit card theft, credit score reduction, banking theft, and tax fraud. By securing a consumer's network traffic through an embedded VPN such risks may be minimized as the consumer's information is protected upon transmission.

In some aspects, a private connect VPN may include at least one processor and a memory unit storing computer-executable instructions. The private connect VPN may be configured to, in operation, provide a secure and private connection when connecting to Internet sites from a computing device such as a mobile device. The private connect VPN may also be configured to, in operation, provide semi-anonymous connections and/or fully anonymous browsing. The private connect VPN may also be configured to, in operation, provide traffic analysis and additional protection, prevention, and added value services based on an analysis of traffic patterns, visits dwell time and other metrics. Additionally, the private connect VPN may, in operation, also generate a dashboard summarizing all of a user's online activity.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
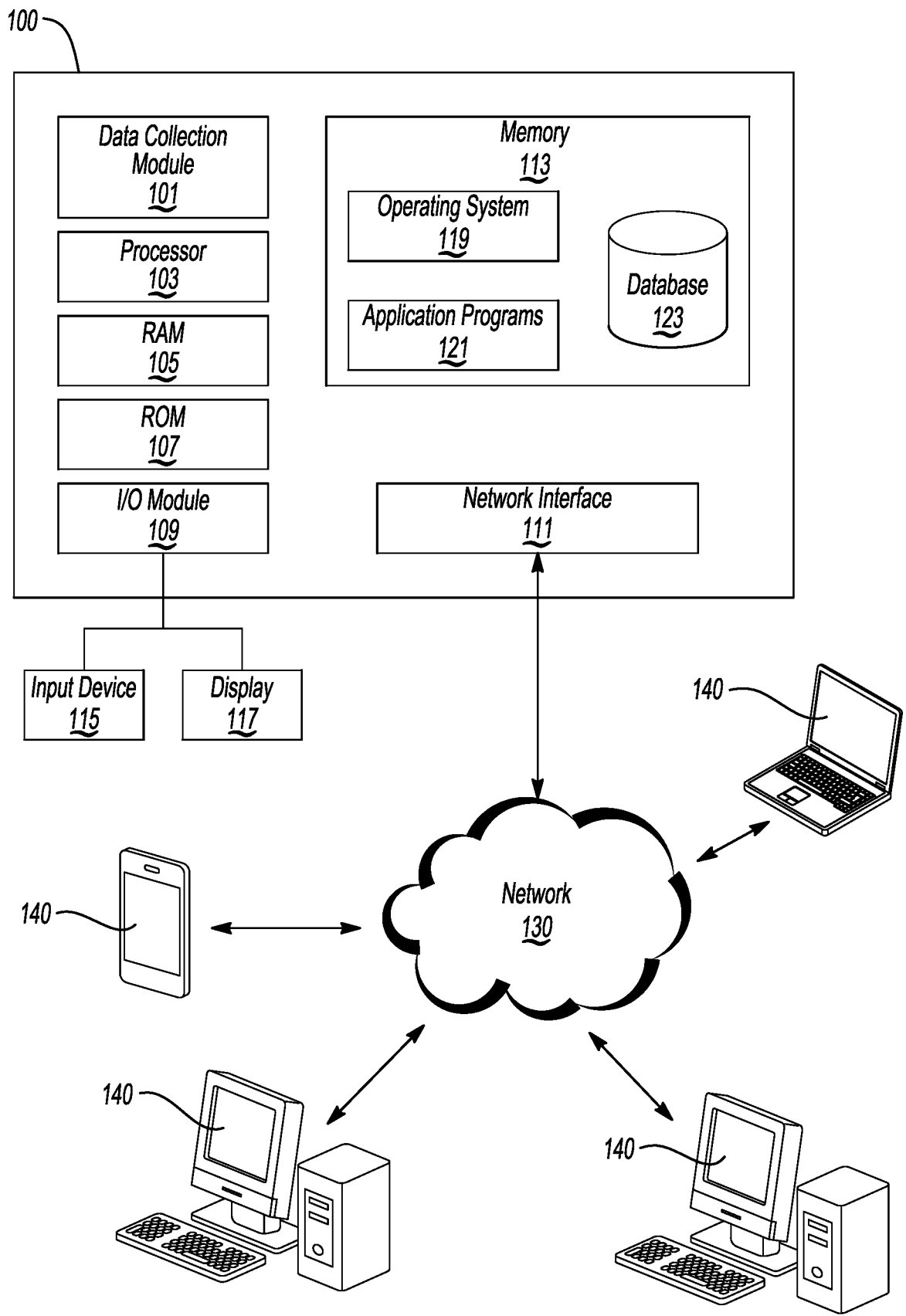
FIG. 1 illustrates an example private connect VPN device that may be used in accordance with one or more aspects described herein.

In one or more arrangements, aspects of the present disclosure may be implemented with a computing device. FIG. 1 illustrates a block diagram of an example private connect VPN device 100 that may be used in accordance with aspects described herein. The private connect VPN device 100 may be a computing device, such as a personal computer (e.g., a desktop computer), server, laptop computer, notebook, tablet, smartphone, vehicles, home management devices, home security devices, smart appliances, etc. The private connect VPN device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, private connect VPN device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the security monitoring device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the security monitoring device 100 may provide input data. The I/O module 109 may also be configured to be connected to a display device 117, such as a monitor, television, touchscreen, etc., and may include a graphics card. The display device 117 and input device 115 are shown as separate elements from the cyber-security device 100; however, they may be within the same structure. On some cyber-security devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the cyber-security device 100 to perform various functions. For example, memory 113 may store software used by the cyber-security device 100, such as an operating system 119 and application programs 121, and may include an associated database 123.

The network interface 111 allows the private connect VPN device 100 to connect to and communicate with a network 130. The network 130 may be any type of network, including a local area network (LAN) and/or a wide area network (WAN), such as the Internet, a cellular network, or satellite network. Through the network 130, the private connect VPN device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as cyber-security device 100. In some embodiments the private connect VPN device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
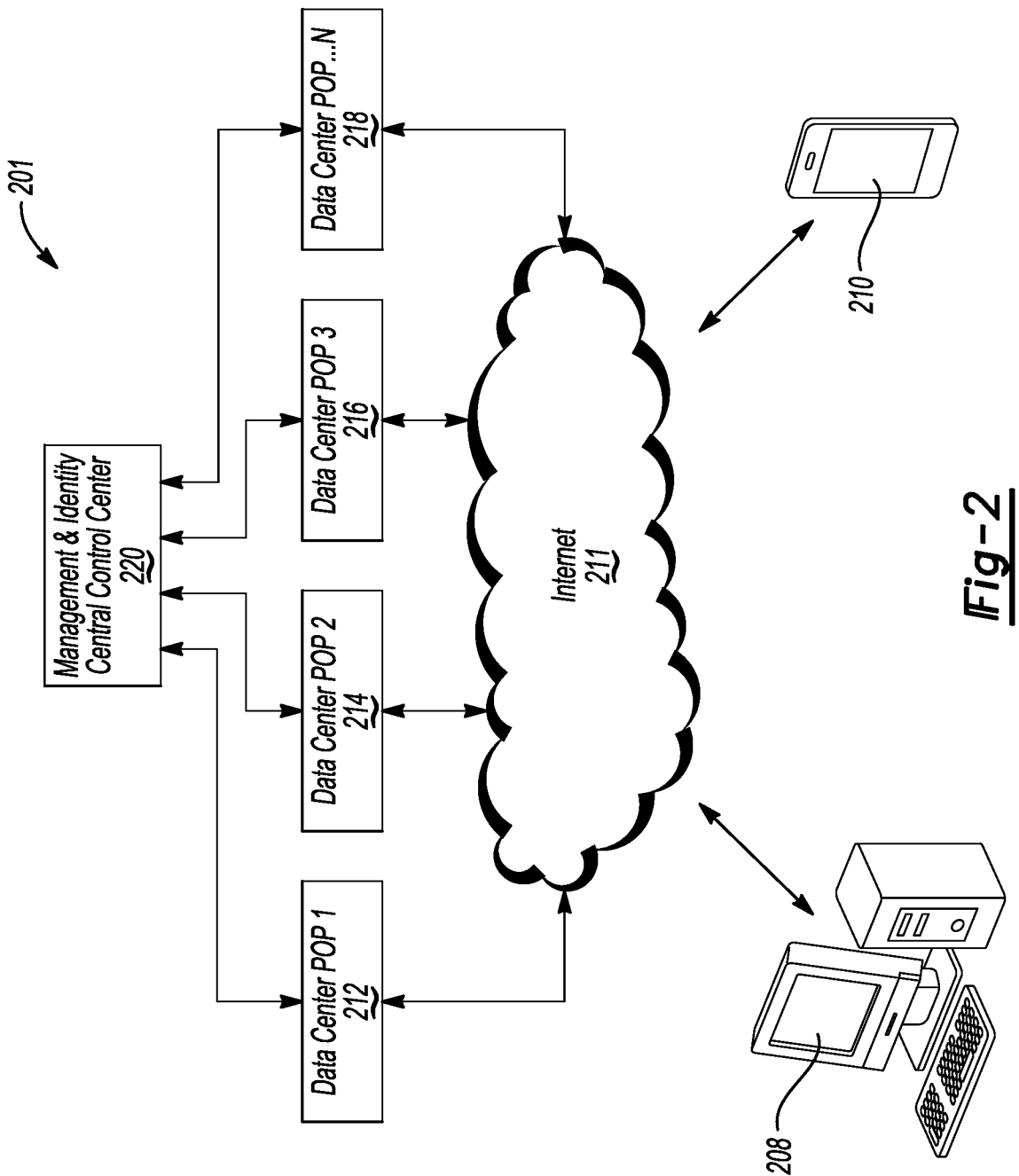
FIG. 2 shows a block diagram illustrating the system architecture for a private connect VPN system in accordance with one or more aspects described herein.

FIG. 2 shows a block diagram illustrating system architecture for a private connect VPN system. A private connect VPN system 201 may collect information from and transmit information to a consumer through various different channels such as a user mobile computing device 210, a desktop computer 208, or other computing device such as a server, laptop computer, notebook, tablet, smartphone, vehicles, home management devices, home security devices, and/or smart appliances.

In FIG. 2, computing devices such as mobile computing device 210 and desktop computer 208 may connect to one of the Data Centers POPs 212 through 218 on its way to a destination website. For instance, mobile computing device 210 may connect via the Internet 211 to Data Center POP 1 212. The connections to Data Center POP 1 212 from mobile computing device 210 and from the Data Center POP 1 212 to the destination website are secure connections. To the destination website the traffic appears to be coming from the Data Center POP 1 212 and not mobile computing device 210.

VPNs may include enterprise VPNs and consumer VPNs. Enterprise VPNs are designed to protect a specific set of connections and traffic flows that are all directed to enterprise servers. Generally, in an enterprise VPN, all traffic not directed to the enterprise servers is transmitted on the open Internet directly to the end node (although this may be a configurable option). To accomplish this, enterprise VPNs generally have a specific list of IP addresses generated by the enterprise VPN server at the central enterprise location, to be used by all traffic to be sent through the VPN tunnel. IP addresses that are not on the secure enterprise list are typically transmitted in the clear over an open Internet connection. By using this identified secure traffic list, the traffic that goes through the VPN is limited to traffic that the enterprise considers in need of additional security. This can include both browser and application traffic.

Consumer VPNs are generally also designed to secure traffic but also provide access to applications and services across blocked regions as well as anonymizing the user. In a consumer VPN, all traffic regardless of end destination, is sent through the VPN and the user is generally enabled to connect to a specific regional server location from a list of available servers. This enables the user to define the location that their traffic enters the Internet. Specifically, this enables a user to decide to have their traffic appear to originate in a region where they are not physically located.

VPNs may also provide user anonymization. By changing both the IP address and other information about the actual end user at the VPN server, user information is not transmitted to the end node in certain identifiable ways. Many consumer VPNs also offer user protections from general snooping and identification.

Figure 3:
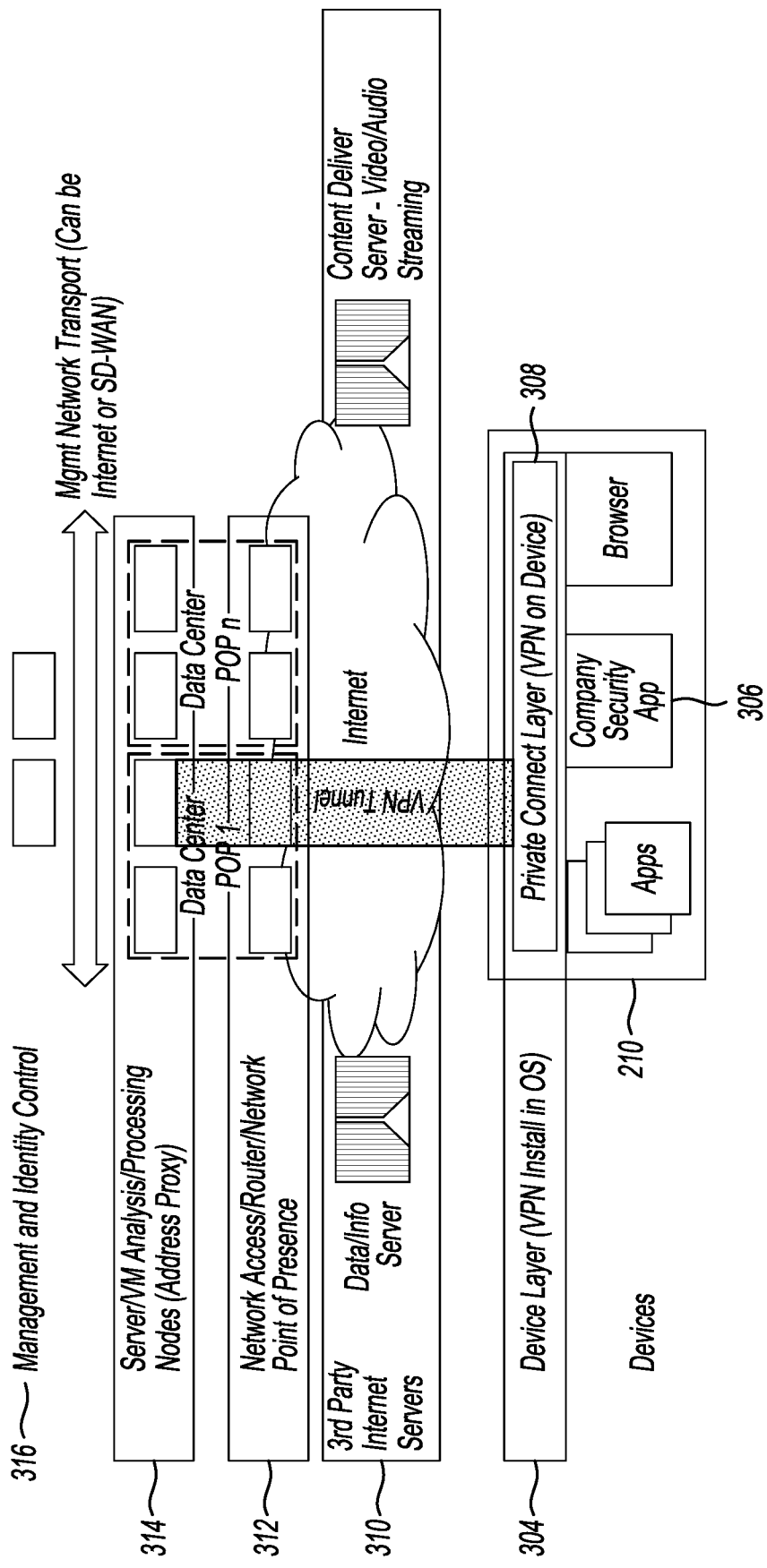
FIG. 3 illustrates the architectural layers of a private connect VPN system in accordance with various embodiments of this disclosure.

The illustrated architecture of FIGS. 2 and 3 deliver secure communications over the Internet for all connections types. In particular, FIG. 3 illustrates the architectural layers 302 of a private connect VPN system in accordance with various embodiments of this disclosure.

In FIG. 3, the private connect VPN may allow for the transmission of video and audio streaming in the clear outside of any generated VPN tunnels in accordance with various aspects of the disclosure. In other embodiments, private connect VPN provides that all traffic flows through a generated VPN.

In an aspect of the disclosure, the private connect VPN system supports numerous forms of computing devices including desktop devices and their most commonly used web browsers. In an aspect of the disclosure, each computing device may have components installed as shown in FIG. 3. At the device layer 304, in an embodiment, two components may be installed on a computing device including a security application 306 and a private connect layer 308.

In an embodiment, security application 306 may be accessed by a user of the computing device. The security application 306 may be the container for the overall service. In an embodiment, the security application 306 provides authentication for both the user and the computing device.

In an aspect of the disclosure, the security application 306 communicates over the Internet 211 to the centralized management and control layer 309 to determine the best point of presence for private connect VPN tunnel termination. In an embodiment, the determination of the best point of presence may be based on the user's physical and Internet location and available route paths. In an embodiment, security application 306 instructs private connect layer 308 as to which point of presence termination location to use so that a connection may be made to establish a private connect VPN tunnel.

In an aspect of the disclosure, the private connect layer 308 may establish the private connect VPN functions. In an embodiment, the private connect layer 308 may be installed as a private connect VPN application service in devices, including both mobile devices and traditional personal computers. In an embodiment, the device layer 304 receives packets from the internal network processing software. If there is transmission of streaming traffic in the clear, the device layer 304 may determine whether traffic is transmitted in the private connect VPN tunnel or is transmitted in the clear.

In another aspect of the disclosure, content traffic such as video and/or audio streaming that may originate from third party Internet servers 310 may be sent in the clear over an unencrypted connection by the private connect layer 308 while data or other information traffic that may originate from third party Internet servers 310 is sent through the private connect VPN tunnel for both security and traffic analysis for threats or other issues. In an embodiment, device layer 304 may encrypt all traffic that is not content and send the traffic over the private connect VPN tunnel to the specific data center POP that was selected in the private connect connection establishment process. In an embodiment, device layer 304 gathers usage statistics to provide to the security application 306 for both encrypted tunnel traffic as well as in the clear traffic.

In another aspect of the disclosure, security application 306 may dynamically change the data center POP termination destination on the fly. Dynamically changing data center POP's during transmission or in between transmission streams may be used to improve load balancing.

In yet another aspect of the disclosure, multi-path IP routes may be determined between one or more POP's and a user's device to improve performance and reliability. The device layer 304 may provide software defined wide area networks (SD-WANs). In an embodiment, device layer 304 may open multiple IP routes simultaneously from its network assigned IP address to the POP location. In an embodiment, device layer 304 and data center POP may exchange packets to measure operational performance of the different paths dynamically and select the best path to use at a specific time. The use of multi-path IP routes may avoid the waves of Internet congestion that can impact throughput.

In an aspect of the disclosure, network access/router/network POP application layer 312 includes numerous data centers housing numerous routers and networking processing equipment that is part of the overall POP data center architecture. In an embodiment, the routers and network processing equipment receive and transmit data packets to and from user devices and to and from the third party Internet servers 310. In an embodiment, the data networking requirement may be generally twice the actual capacity of the private connect VPN as all traffic must enter and exit through the network access/router/network POP application layer 312. The network access/router/network POP application layer 312 provides core networking functionality at the POP data center. In an embodiment, if multi-path IP (SD-WAN) is utilized between POP data centers and user devices for performance and reliability it may be implemented in this layer.

In an aspect of the disclosure, a server/VM analysis/processing nodes application layer 314 may determine traffic routing and security processing for the private connect VPN system. In an embodiment, server/VM analysis/processing nodes application layer 314 may decrypt traffic from the connected devices. Server/VM analysis/processing nodes application layer 314 may utilize IP based address and port management techniques to retransmit the traffic to the appropriate server to complete the transactions. Server/VM analysis/processing nodes application layer 314 operates on the IP level.

In an embodiment, server/VM analysis/processing nodes application layer 314 may redirect traffic to the third party servers, using Network Address Translation (NAT) for address management, security, and privacy. Server/VM analysis/processing nodes application layer 314 may also analyze destination IPs for compromised locations and other security threats. Server/VM analysis/processing nodes application layer 314 may maintain a log of traffic for duration of any private connect VPN session. In an embodiment, logs may be uploaded to the management and identity control layer 316.

In an aspect of the disclosure, management and identity control application layer 316 may be part of a centralized operational management system. In an embodiment, management and identity control application layer 316 may maintain user profiles, available services, access restrictions, etc. Management and identity control application layer 316 may authenticate and validate the user identity and the device being utilized by the user.

In yet another aspect of the disclosure, management and identity control application layer 316 may determine which POP to assign the private connect VPN traffic to, based on access to the user's physical location information in the device and/or the IP route paths. In another embodiment, a user may request use of a specific Data Center POP via the management and identity control application layer 316.

In another aspect of the disclosure, management and identity control application layer 316 provides user profile information to manage traffic flow and alert users to threats and compromised locations. In an embodiment, if anonymization is not enabled, management and identity control application layer 316 may maintain logs and usage data for user traffic.

Figure 4:
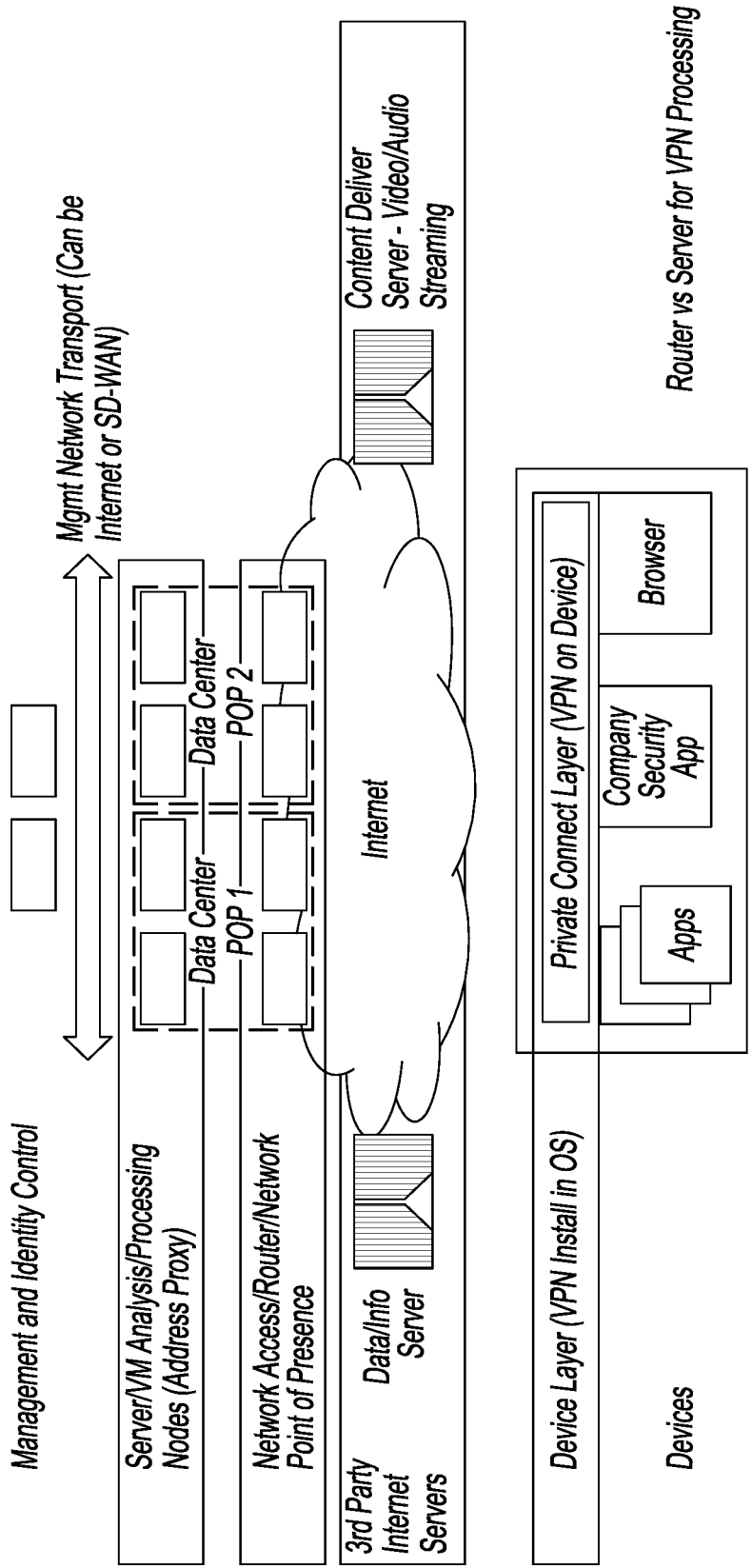
FIG. 4 illustrates at a computing device not connected to a network in accordance with one or more aspects described herein.

In an aspect of the disclosure, all traffic from a computing device may be routed through the private connect VPN system. FIG. 4 illustrates at 402 a computing device not connected to a network. In an embodiment, the device illustrated in FIG. 4 may be unpowered or a user has disconnected the computing device from the network.

Figure 5:
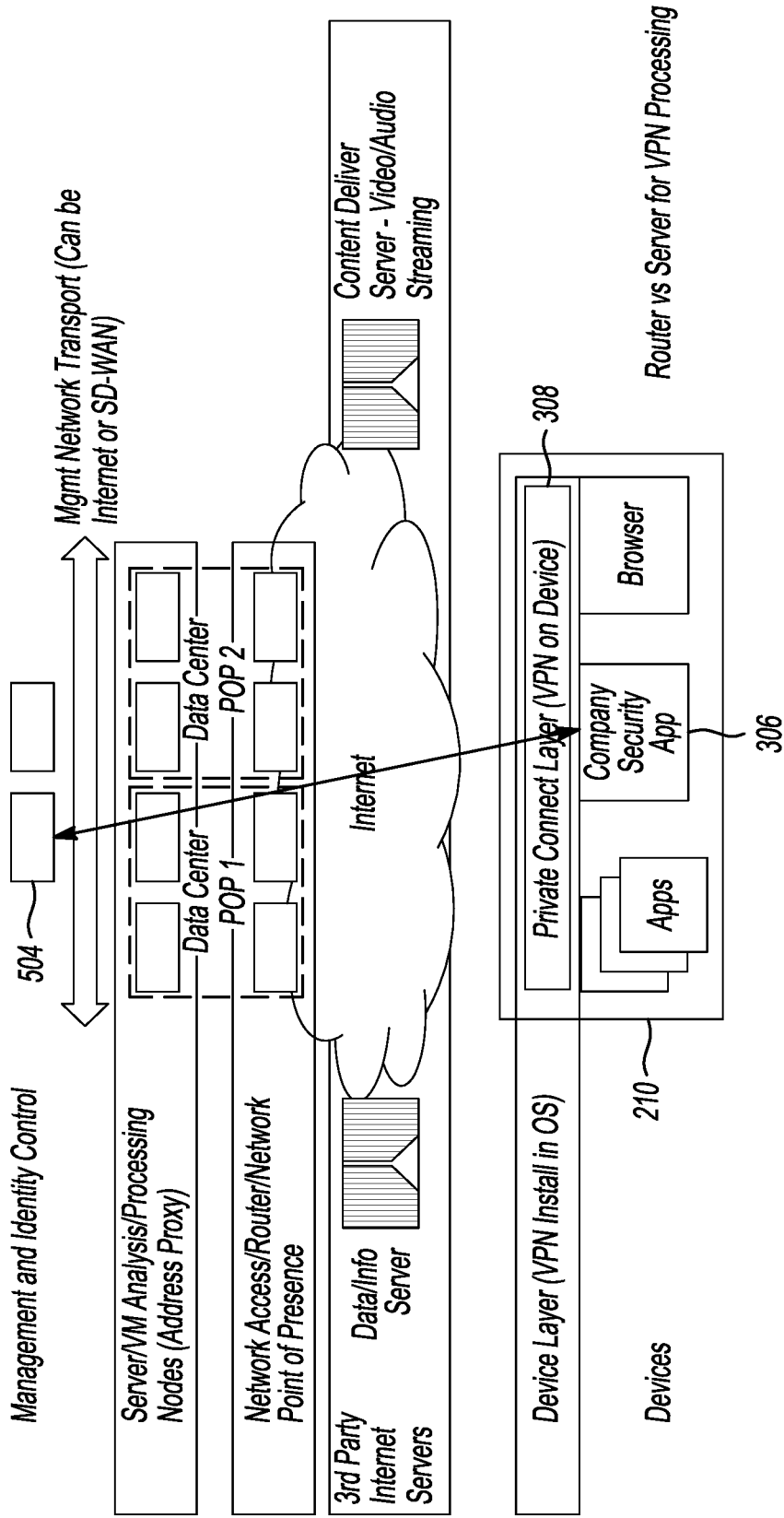
FIG. 5 illustrates a computing device being connected to a network in accordance with one or more aspects described herein.

FIG. 5 illustrates a device being connected to the network in accordance with an aspect of the disclosure. For example, after power up a device such as device 210 connects to the network. Upon network connection, security application 306 installs on computing device 210. In an embodiment, security application 306 may be part of a start menu service for computing device 210.

In an aspect of the disclosure, security application 306 connects to one of the Management and Information (M&I) servers such as M&I server 504. The M&I server 504 confirms user identity and profile information for use during session connection and operation. In an embodiment, a private connect VPN termination server location can be selected by M&I server 504. In an embodiment, M&I server 504 also determines the best POP for this connected session based on location and IP paths. In an alternative embodiment, user preference may be used to determine the POP for a connected session.

In another aspect of the disclosure, the initial connection by computing device 210 may be accomplished using private connect layer 308 with Open Shortest Path First (OSPF) functionality or in the clear with encryption at the applications level. In an embodiment, the M&I server 504 and the security application 306 provides POP data to private connect layer 308 for POP connectivity.

Figure 6:
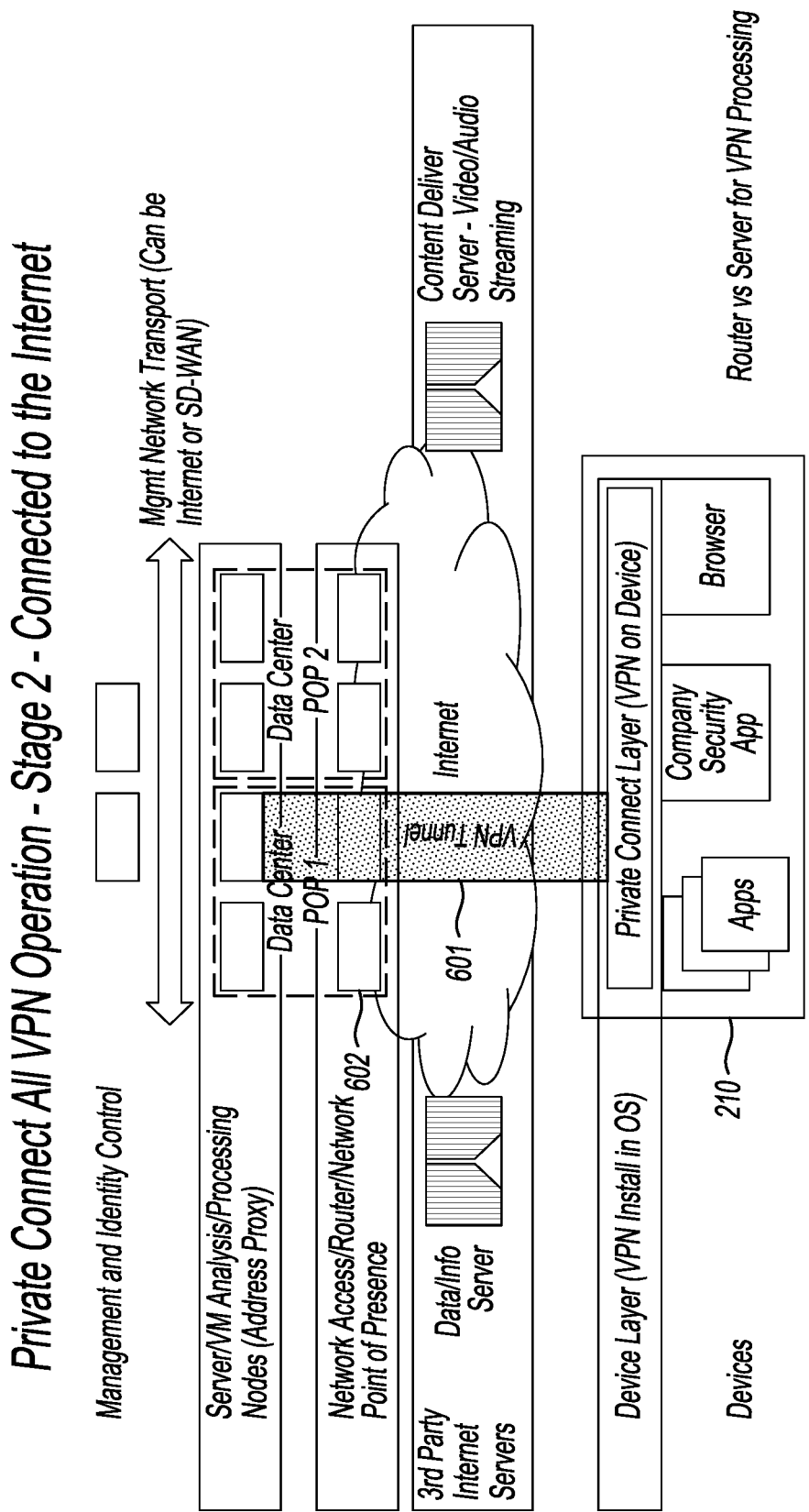
FIG. 6 illustrates a private connect VPN tunnel in accordance with one or more aspects described herein.

FIG. 6 illustrates a private connect VPN tunnel 601 being generated between a computing device 210 and data center POP 1 602. In an aspect of the disclosure, an encapsulated private connect VPN tunnel is established using a network assigned IP address of the endpoint and the IP address of data center POP 1 602. In an embodiment, the private connect tunnel 601 may be established using the available built in VPN tunnel protocols in computing device 210. In an alternative embodiment, private connect VPN tunnel 601 may be established by loading a company specific protocol into the VPN level of computing device 210. The private connect VPN tunnel 601 secures all traffic from computing device 210 through use of IP encapsulation. In an embodiment, the private connect VPN tunnel 601 terminates into the server layer in the core.

Figure 7:
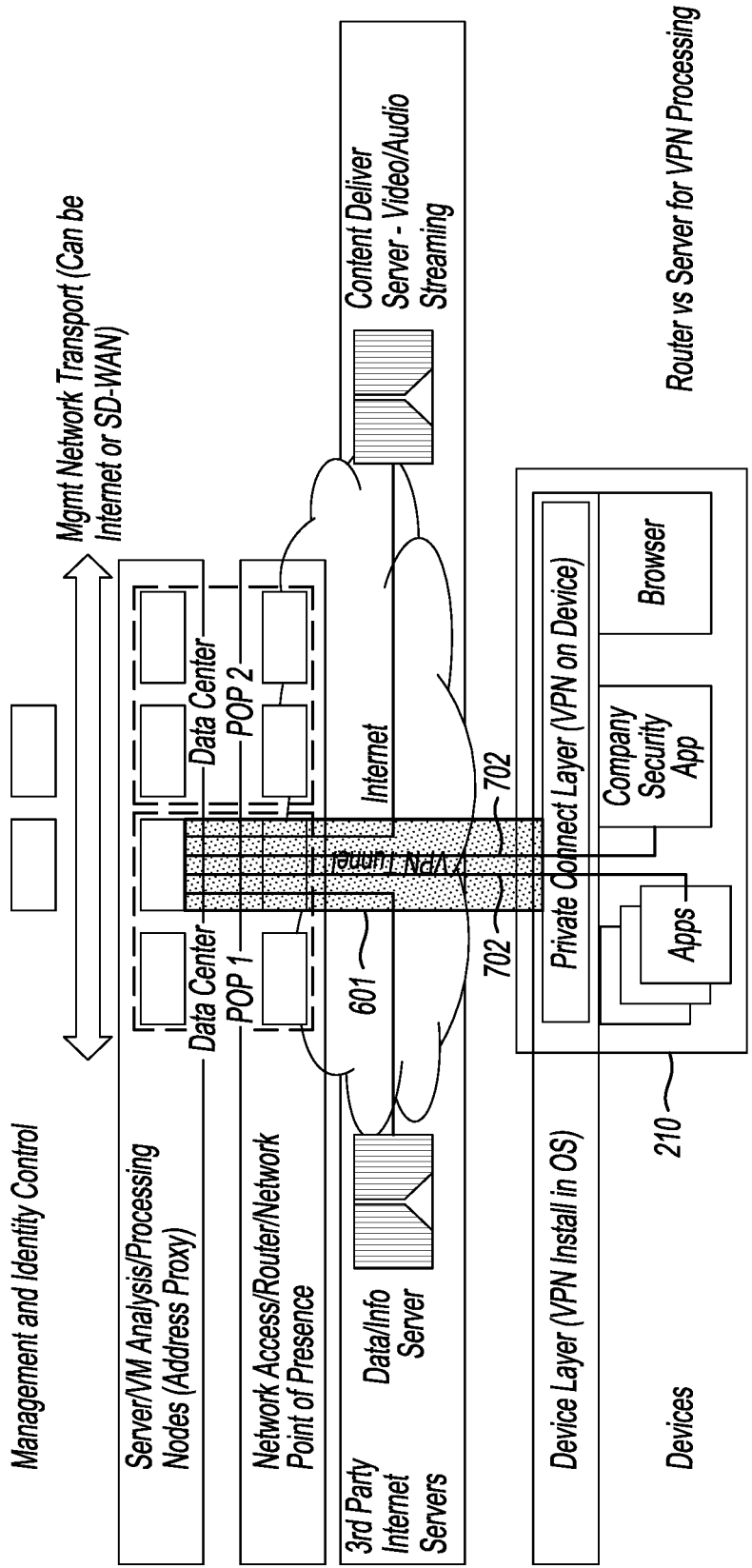
FIG. 7 illustrates traffic stream being transmitted through a private connect VPN tunnel in accordance with one or more aspects described herein.

In an aspect of the disclosure, and as shown in FIG. 7, during operation all traffic streams 702 may be sent through the private connect VPN 601 between the chosen POP and computing device 210. The encryption may be chosen based on the decision to either use the device's built in VPN protocols or a specific encryption implementation. In an embodiment, traffic may be decrypted and mirrored using the assigned address through the Server/VM Analysis/Processing layer 314. The end device location and IP address may be hidden by the VPN core.

Figure 8:
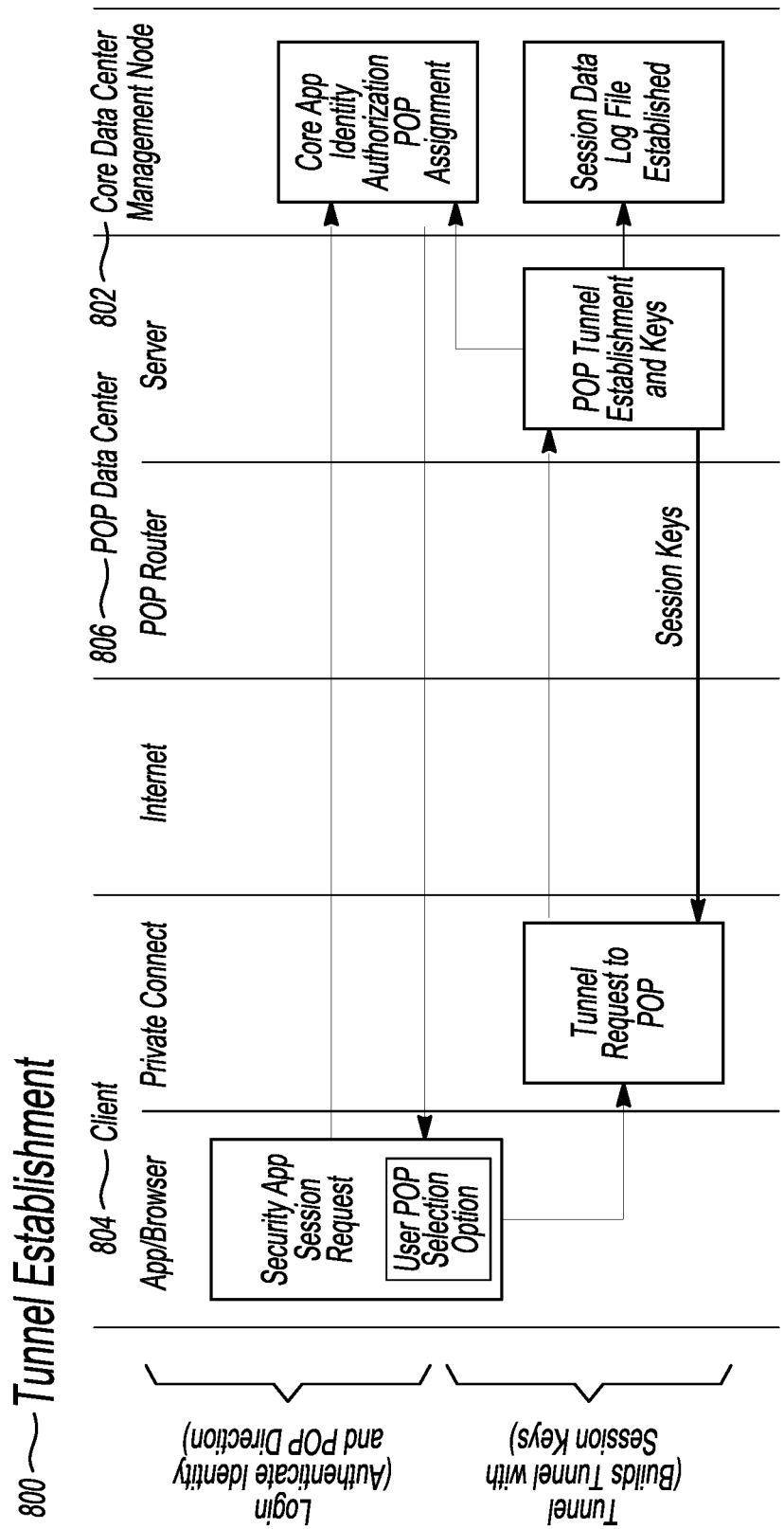
FIG. 8 illustrates a connection state diagram for private connect VPN tunnel establishment in accordance with one or more aspects described herein.

FIG. 8 illustrates the connection state diagram 800 for the private connect VPN tunnel establishment. In an aspect of the disclosure, an M&I server located at the core data center management node 802 confirms user identity and profile information for use during session connection and operation. In an embodiment, a private connect VPN termination server location can be selected by M&I server. In an embodiment, M&I server also determines the best POP for this connected session based on location and IP paths. In an alternative embodiment, user preference may be used to determine the POP for a connected session. In an embodiment, a private connect VPN tunnel is generated between the client 804 and data center POP 806.

Figure 9:
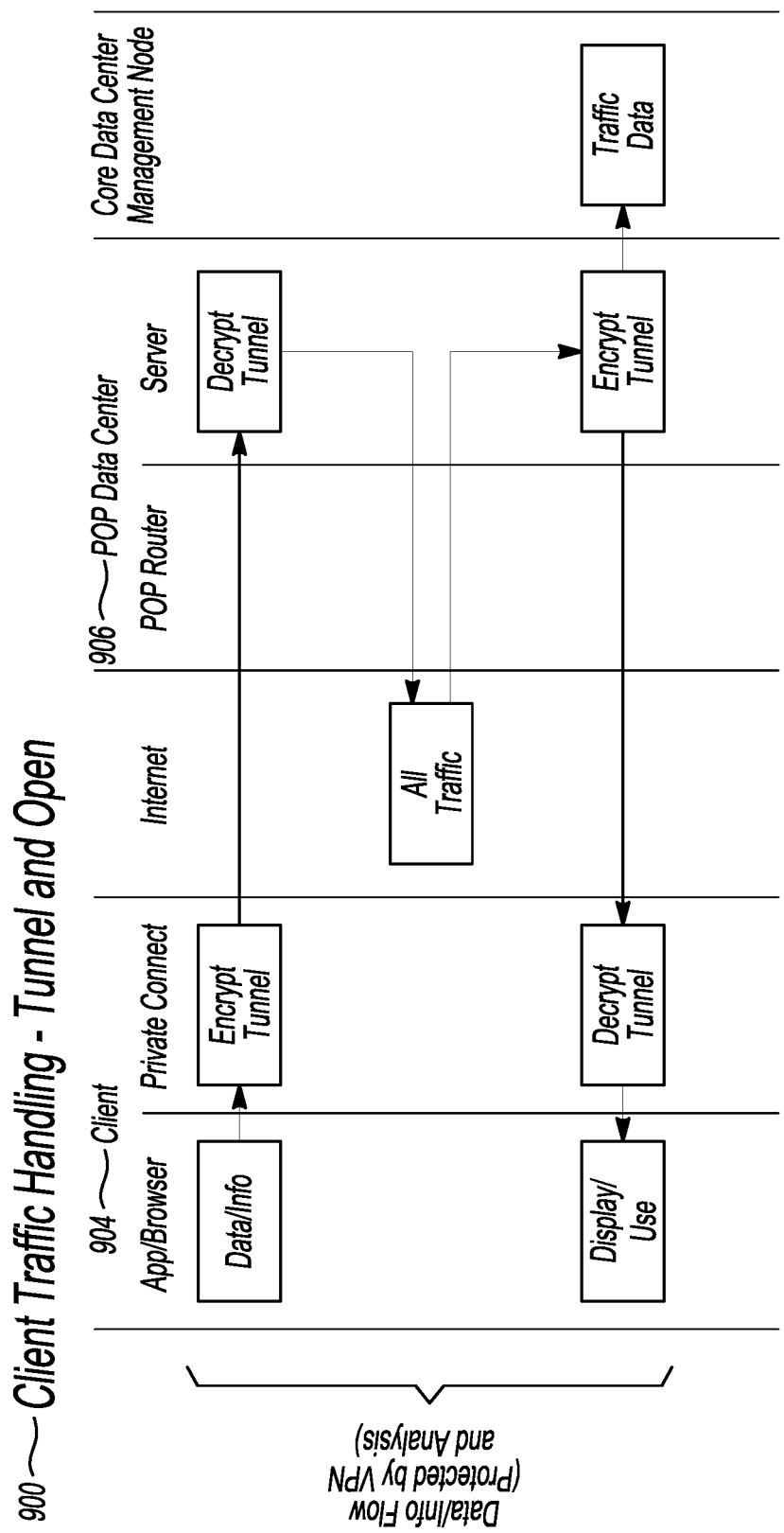
FIG. 9 illustrates a connection state diagram for private connect VPN traffic handling in accordance with one or more aspects described herein.

FIG. 9 illustrates the connection state diagram 900 for private connect VPN traffic handling. In an embodiment, as illustrated in FIG. 9, once the private connect VPN tunnel is generated all traffic between client 904 and POP data center 906 may pass through the private connect VPN tunnel. In an embodiment, sending all traffic from client 904 through the generated private connect VPN tunnel may anonymize the client to all data and content providers and provide the user with access to non-regional allowed data.

In an aspect of the disclosure, sending all data through a generated private connect VPN may reduce performance unnecessarily. In an embodiment, the private connect VPN architecture includes traffic inspection to determine whether the such traffic should travel through the generated private connect VPN tunnel. In an aspect of the disclosure, traffic inspection allows separate handling of streaming media content, reducing the load while improving video streaming handling.

Figure 10:
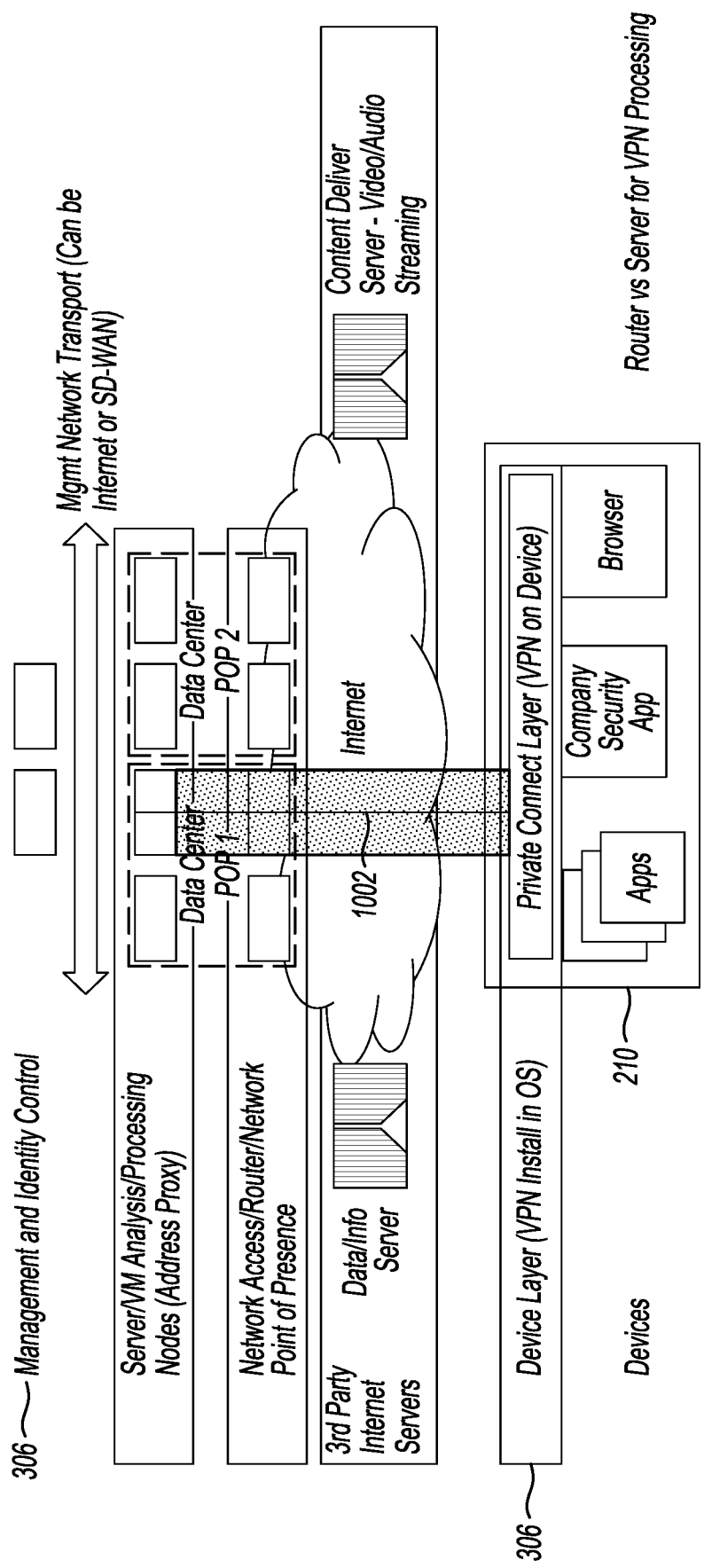
FIGS. 10-13 illustrate traffic inspection for use in determining that should travel through the private connect VPN tunnel in accordance with one or more aspects described herein.
Figure 11:
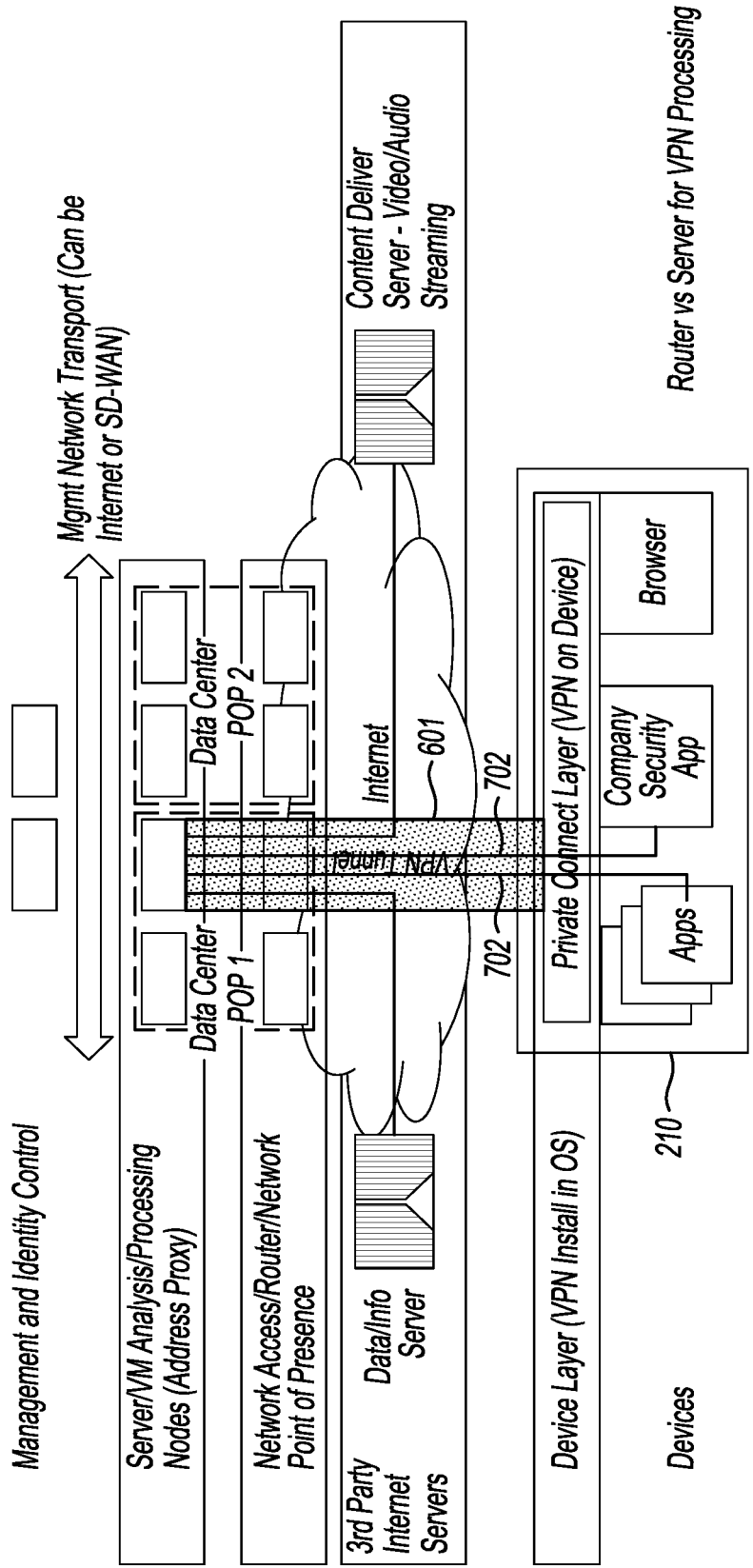

FIGS. 10-13 illustrate traffic inspection for use in determining data which should travel through the private connect VPN after a computing device has been powered up, connected to the network, and established a private connect VPN tunnel similar to discussion above with respect to FIGS. 4-9. In FIG. 10, a DNS request 1002 is transmitted from a computing device 210 to a DNS server located in a Data Center. In an alternative embodiment, the DNS sever may also be located in the Management and Identity control layer 316.

In an aspect of the disclosure, the received DNS request is resolved to the IP address of the serving service. In an embodiment, the core maintains a list of known content server IP addresses used to manage flows and flow trust. These may be determined by identifying the top streaming content delivery sites. The identified specific IP addresses can be indexed and stored. Other ways to identify known content server IP addresses are identification in CDN networks or using flow analysis in the core of traffic to determine streaming content IP addresses.

In an embodiment, using these techniques, a list of identified content IP addresses may be maintained. In an aspect of the disclosure, when a DNS request is processed, the returned IP address will be marked whether the traffic should be in or out of the tunnel, based on analysis of the list.

In an aspect of the disclosure, a DNS request may be analyzed against a white/black/threat list as they are processed. In an embodiment if a DNS URL request returns an IP address that is a known bad actor, that request may be either blocked or routed to an alternative location.

In an aspect of the disclosure, when a request for a DNS resolution returns a known content streaming IP address, the client device is instructed to send requests "in the clear", not through the IP tunnel. In an embodiment, all other traffic, including all data or information traffic that may include sensitive information, and any content that cannot be specifically resolved is sent through the VPN tunnel.

In an embodiment, device layer 304 may manage the traffic between the private connect VPN tunnel and the clear. In an embodiment, the core may only process traffic that is not streaming content. In an aspect of the disclosure, device layer 304 may collect analytics on content traffic that does not flow through the private connect VPN tunnel.

The initial state to build the tunnel may be the same as described above for the private connect VPN system. After the tunnel is established, the following shows the DNS states as the traffic is identified and the path is communicated to the Client Layer.

Figure 12:
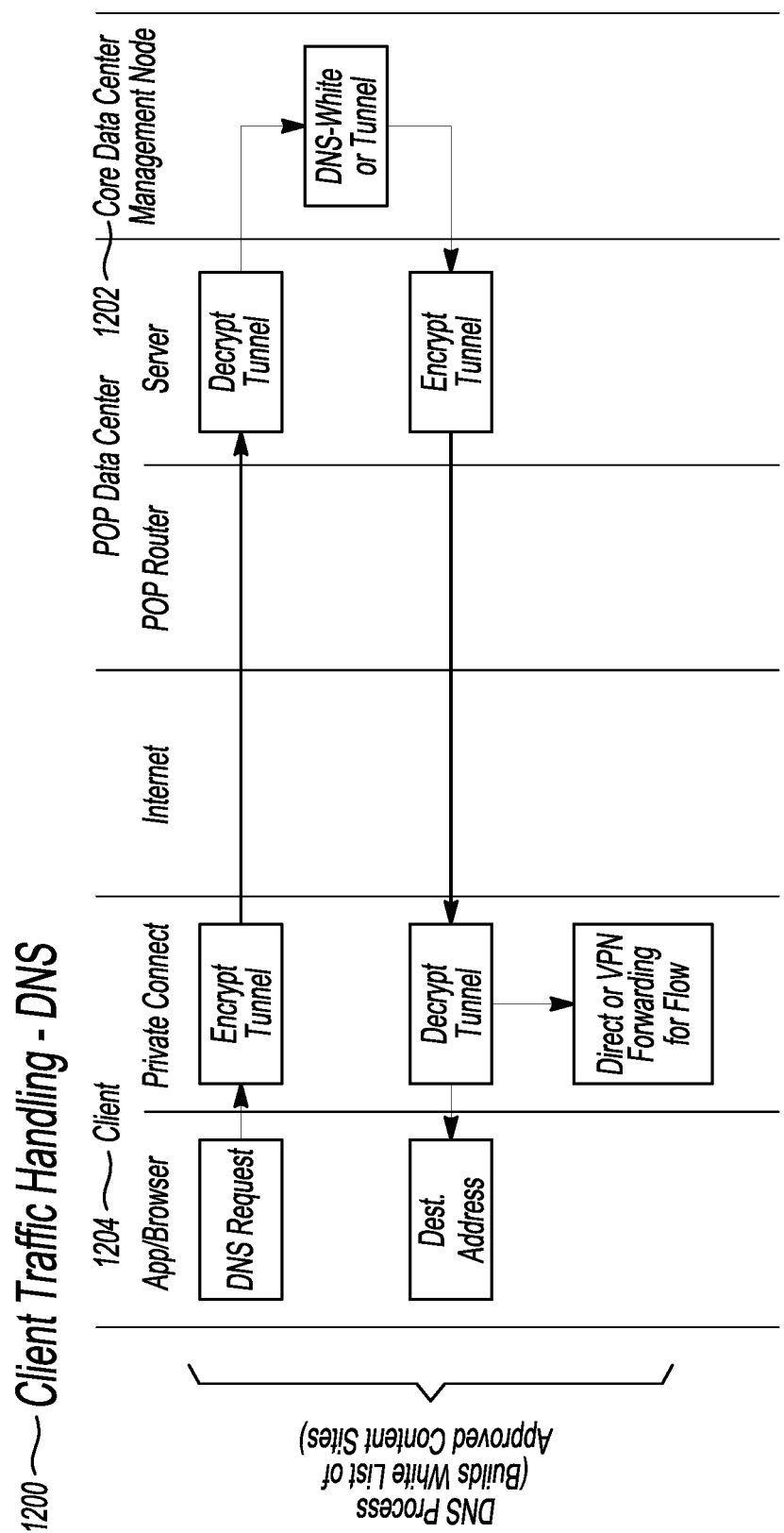

FIG. 12 illustrates the connection state diagram 1200 for private connect VPN traffic identification. In an aspect of the disclosure, a DNS server located at the core data center management node 1202 determines the path the traffic flow will take and communicates that information back to the client 1204.

Figure 13:
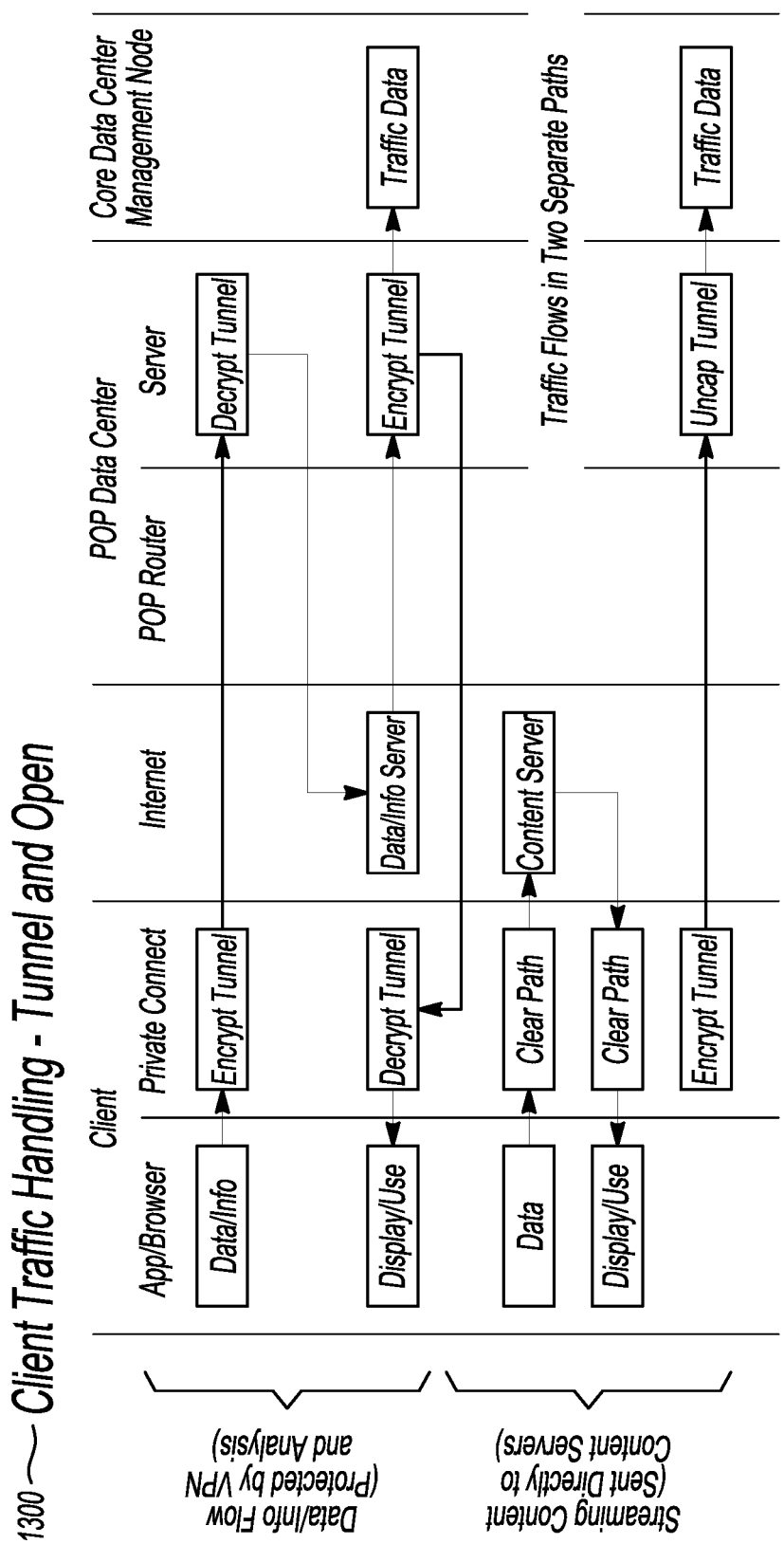

FIG. 13 illustrates a connection state diagram 1300 in which some traffic will flow through the generated private connect VPN tunnel while other traffic will be delivered along a separate delivery path (not through private connect VPN tunnel) as determined by analysis of the DNS request and IP destination addresses.

In another aspect of the disclosure, separate backhaul connections may be made between the POPs. In an embodiment, these separate backhaul connections may assist with traffic Management and Internet congestion.

In an embodiment, when a user is connected to a specific POP, all traffic that flows through the private connect VPN will enter the open Internet at that location (both physical and IP logical). By having a private backhaul between the POPs, traffic may be routed through this backhaul to the POP closest to the serving server Internet location. This may result in improved performance and may also mitigate issues with ISP traffic loads.

In an embodiment, the backhaul may use a dedicated private backhaul (actual permanent connection paths between POPS) or Internet connectivity using SD-WAN or other Software Defined Networking (SDN) techniques.

In another aspect of the disclosure, the private connect VPN system may protect the digital footprint of the user by monitoring Internet activity. For instance, the private connect VPN system may warn of potential threats and/or dangerous sites. In an embodiment, the private connect VPN system may monitor traffic through VPN tunnel to detect malware or other potential threats. In an embodiment, a dashboard may be constructed and presented, informing the users about their patterns and volumes of online activity. In an embodiment, based on the information a user could explicitly opt into a service that tracks their browsing and alerts them to unsafe activities.

Figure 14:
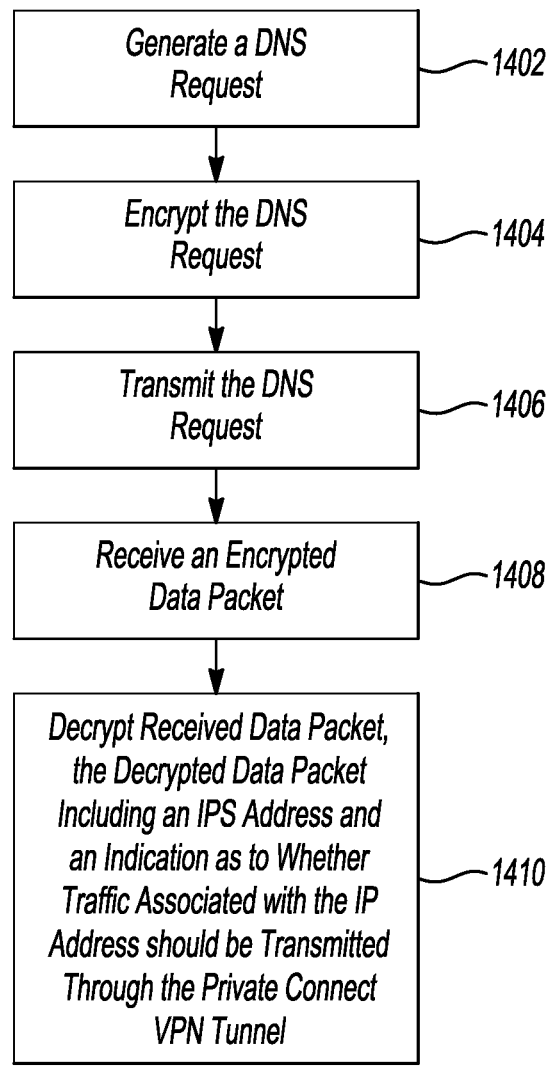
FIG. 14 illustrates an exemplary method of determining if traffic associated with the IP address will be forwarded through the private connect VPN tunnel upon transmission in accordance with one or more aspects described herein.

FIG. 14 illustrates an exemplary method of determining if traffic associated with the IP address will be forwarded through the private connect VPN tunnel upon transmission in accordance with one or more aspects described herein. In FIG. 14 at step 1402, a DNS request may be generated. The DNS request may be encrypted in step 1404 and transmitted in step 1406 through a private connect VPN tunnel. In step 1408, an encrypted data packet may be received through the private connect VPN tunnel. The encrypted data packet may be decrypted in step 1410. The decrypted data packet may include an IP address and an indication as to whether the traffic associated with the IP address should be transmitted through the private connect VPN tunnel.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A virtual private network device comprising:
a processor;
a memory unit storing computer-executable instructions, which when executed by the processor, cause the virtual private network device to:
generate a DNS request;
encrypt the DNS request;
transmit the encrypted DNS request through a virtual private network tunnel to a data center;
receive an encrypted data packet from the data center through the virtual private network tunnel;
decrypt the received encrypted data packet, the decrypted data packet including an IP address associated with the DNS request and an indication as to whether traffic associated with the IP address should be sent through the virtual private network tunnel; and
using the IP address, transmit a request for content through the virtual private network tunnel or transmit the request for content outside of the virtual private network tunnel, depending on the indication.

2. The virtual private network device of claim 1, wherein the traffic associated with the IP address includes streaming content.

3. The virtual private network device of claim 2, wherein the streaming content is not routed through the virtual private network tunnel.

4. The virtual private network device of claim 1, wherein the traffic associated with the IP address includes user data.

5. The virtual private network device of claim 4, wherein the user data is transmitted through the virtual private network tunnel.

6. A method comprising:
generating a DNS request;
encrypting the DNS request;
transmitting the encrypted DNS request through a virtual private network tunnel to a data center;
receiving an encrypted data packet from the data center through the virtual private network tunnel;
decrypting the received encrypted data packet, the decrypted data packet including an IP address associated with the DNS request and an indication as to whether traffic associated with the IP address should be sent through the virtual private network tunnel; and
using the IP address, transmitting a request for content through the virtual private network tunnel or transmitting the request for content outside of the virtual private network tunnel, depending on the indication.

7. The method of claim 6, wherein the traffic associated with the IP address includes streaming content.

8. The method of claim 7, wherein the streaming content is not routed through the virtual private network tunnel.

9. The method of claim 6, wherein the traffic associated with the IP address includes user data.

10. The method of claim 9, wherein the user data is transmitted through the virtual private network tunnel.

11. A method comprising:
receiving an encrypted DNS request through a virtual private network tunnel;
decrypting the received encrypted DNS request;
resolving the decrypted DNS request to an IP address of a serving service;
generating a data packet comprising the IP address and an indication as to whether traffic associated with the IP address should be sent through the virtual private network tunnel;
encrypting the data packet; and
transmitting the encrypted data packet through the virtual private network tunnel.

12. The method of claim 11, further comprising determining a point of presence located at first data center based on the IP address.

13. The method of claim 12, further comprising monitoring traffic associated with the point of presence.

14. The method of claim 13, further comprising:
determining that the monitored traffic received at the point of presence is above a threshold; and
based upon the determination that the monitored traffic is above the threshold, routing traffic to a second point of presence through a backhaul channel.

15. The method of claim 14, wherein the second point of presence is located at a second data center.

16. The method of claim 11, further comprising analyzing DNS requests for IP addresses that pose security risks.

17. The method of claim 16, further comprising blocking IP addresses that pose the security risks.

18. The method of claim 11, further comprising generating a white list including IP addresses of services known to be streaming content delivery sites.

19. The method of claim 18, further comprising determining the indication as to whether traffic associated with the IP address should be sent through the virtual private network tunnel based in part on contents of the white list.

20. The method of claim 19, further comprising:
monitoring activity through the virtual private network tunnel for potential security breaches; and displaying the monitored activity.

* * * * *